(12) United States Patent
Balocco (10) Patent No.: US 9,490,724 B2
(45) Date of Patent: Nov. 8, 2016

(54) METHODS FOR CONTROLLING ELECTRICAL INVERTERS AND ELECTRICAL INVERTERS AND SYSTEMS USING THE SAME

(71) Applicant: AEG Power Solutions BV, Zwanenburg (NL)

(72) Inventor: Didier Balocco, Plestin les Greves (FR)

(73) Assignee: AEG Power Solutions BV, Zwanenburg (NL)

( * ) Notice: Subject to any disclaimer, the term of this patent is extended or adjusted under 35 U.S.C. 154(b) by 0 days.

(21) Appl. No.: 14/141,715

(22) Filed: Dec. 27, 2013

(65) Prior Publication Data

US 2014/0192567 A1   Jul. 10, 2014

Related U.S. Application Data

(60) Provisional application No. 61/749,438, filed on Jan. 7, 2013.

(51) Int. Cl.
| | |
|---|---|
| *H02M 1/12* | (2006.01) |
| *H02M 7/04* | (2006.01) |
| *H02J 3/18* | (2006.01) |
| *H02J 3/38* | (2006.01) |
| *H02J 3/48* | (2006.01) |
| *H02J 3/50* | (2006.01) |

(Continued)

(52) U.S. Cl.
CPC ............. *H02M 7/04* (2013.01); *H02J 3/1814* (2013.01); *H02J 3/1835* (2013.01); *H02J 3/383* (2013.01); *H02J 3/386* (2013.01); *H02J 3/40* (2013.01); *H02J 3/48* (2013.01); *H02J 3/50* (2013.01); *H02M 1/12* (2013.01); *H02M 7/48* (2013.01); *H02J 3/385* (2013.01); *Y02E 10/563* (2013.01); *Y02E 10/58* (2013.01); *Y02E 10/763* (2013.01); *Y02E 40/30* (2013.01); *Y02P 80/23* (2015.11)

(58) Field of Classification Search
CPC ........ H02M 7/04; H02J 3/1835; H02J 3/383; H02J 3/386; H02J 3/48; H02J 3/50
USPC .......... 363/55, 56.1, 56.02, 95, 97, 131, 132
See application file for complete search history.

(56) References Cited

U.S. PATENT DOCUMENTS

| | | | |
|---|---|---|---|
| 5,225,712 A * | 7/1993 | Erdman | ........................ 290/44 |
| 7,193,872 B2 | 3/2007 | Siri | |
| 7,465,872 B1 | 12/2008 | de Rooij | |

(Continued)

OTHER PUBLICATIONS

Copending, co-owned U.S. Appl. No. 14/156,911, filed Jan. 16, 2014.

(Continued)

*Primary Examiner* — Matthew Nguyen
(74) *Attorney, Agent, or Firm* — Cohen & Hildebrand, PLLC (57) ABSTRACT

A system for generating a duty cycle control signal for controlling an inverter power train providing an output current waveform to a grid operating with a grid voltage waveform compares a reference current waveform shaped to the grid voltage waveform with the output current waveform to generate an error signal. The error signal is used to generate a corrective control action signal, which is combined with a feed-forward signal representing a nominal duty cycle generated with a feed-forward function. The combination of the feed-forward signal and the corrective control action signal provide the duty cycle control signal.

20 Claims, 6 Drawing Sheets

(51) Int. Cl.
*H02J 3/40* (2006.01)
*H02M 7/48* (2007.01)

(56) References Cited

U.S. PATENT DOCUMENTS

| | | |
|---|---|---|
| 7,760,526 B2 * | 7/2010 | Marroni et al. ............... 363/95 |
| 8,406,022 B2 | 3/2013 | Kim |
| 2005/0254191 A1 | 11/2005 | Bashaw |
| 2006/0004531 A1 | 1/2006 | Ye |
| 2010/0208501 A1 | 8/2010 | Matan et al. |
| 2011/0187200 A1 | 8/2011 | Yin |
| 2011/0255307 A1 | 10/2011 | Kim et al. |
| 2012/0087159 A1 | 4/2012 | Chapman et al. |
| 2013/0058139 A1 | 3/2013 | Bae |
| 2013/0155736 A1 * | 6/2013 | Ilic et al. ...................... 363/71 |
| 2014/0152331 A1 | 6/2014 | Wagoner |
| 2014/0192567 A1 | 7/2014 | Balocco |

OTHER PUBLICATIONS

Analog Devices Application Note AN21990-11, Jan. 2002 (14 pages).

Keliang Zhou & Danwei Wang, "Relationship Between Space Vector Modulation and Three Phase Carrier Based PWM: A Comprehensive Analysis", IEEE, vol. 49, No. 1, pp. 186-196 (Feb. 2002).

Ciobotaru et al., "Accurate and Less Distributing Active Antiislanding Method Based on PLL for Grid-Connected Converters", IEEE Transactions on Power Electronics, vol. 25, No. 6, Jun. 30, 2010, pp. 1576-1584.

International Search Report for counterpart PCT Application No. PCT/IB2014/000005, Apr. 11, 2014 (2 pages).

R.H. Park, "Two-Reaction Theory of Synchronous Machines Generalized Method of Analysis", AIEE (1929), pp. 81-95.

* cited by examiner

METHODS FOR CONTROLLING ELECTRICAL INVERTERS AND ELECTRICAL INVERTERS AND SYSTEMS USING THE SAME

CROSS-REFERENCE TO RELATED APPLICATION

The present application claims the benefit of U.S. Provisional Patent Application Ser. No. 61/749,438, filed Jan. 7, 2013.

FIELD OF INVENTION

The present invention relates in general to electrical inverters, and in particular, to methods for controlling electrical inverters and systems using the same.

BACKGROUND OF INVENTION

In a traditional electrical utility grid model, the voltage and associated current are provided by large scale utility power plants running from expendable energy sources, such as coal, nuclear, natural gas and oil. However, modern electrical utility grids, in addition to receiving electrical power from traditional energy sources, can now also receive electrical power from multiple alternative and/or renewable energy sources, which may be directly or indirectly connected to the electrical grid. However, notwithstanding the particular types of energy sources (e.g., traditional, alternative, or renewable) providing the electrical power, all of those sources are normally coupled to the associated electrical grid through a grid connected unit, which converts and/or processes the generated electrical energy being sourced to the grid.

Figure 1A:
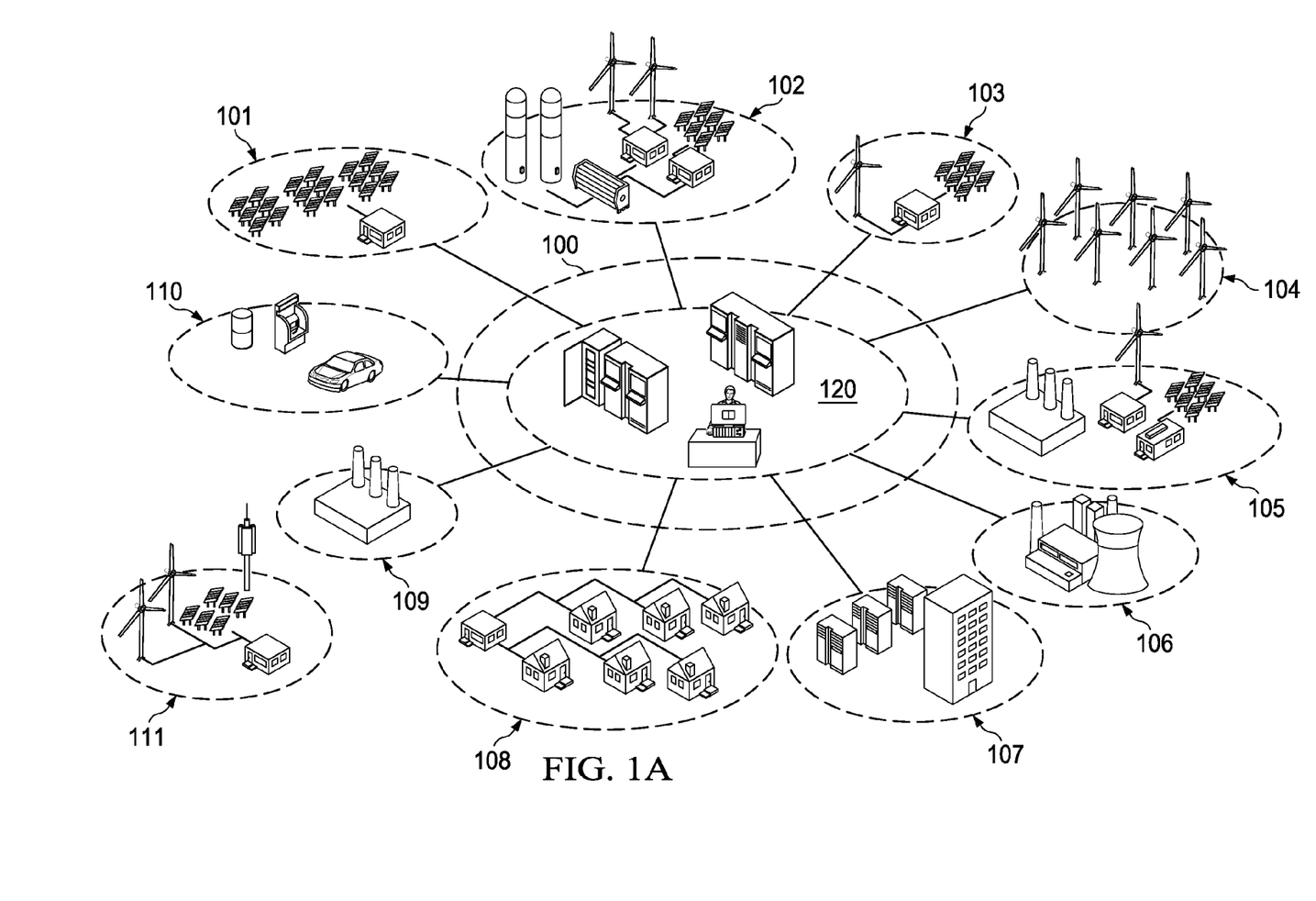
FIG. 1A is a conceptual drawing of a power generation and distribution system including a number of typical electrical power sources, which are either directly or indirectly connected to an electrical power grid through converters or processes suitable for application of the principles of the present invention.

FIG. 1A depicts a conceptual power distribution system including a number of common electrical energy sources, which are either directly or indirectly connected to a conventional electrical grid 100 through a corresponding grid connected united. (In actual practice, the number and types of electrical energy sources connected to a given electrical grid can differ significantly. In addition, while the various energy sources shown in FIG. 1A are represented as consolidated entities, in actual practice, any of these energy sources could comprise multiple subsystems, which are physically and/or functionally distributed over a particular geographical area.)

Electrical grid 100 is controlled by a standard utility-scale control system 120 and is connected to a solar power plant 101, for example, through a central inverter, container solution, monitoring and supervision system, or plant controller. An electrical power to gaseous hydrogen ($H_2$) generation plant 102 is also shown, which could connect to electrical grid 100 through an electrolysis rectifier. The system shown in FIG. 1A also includes a battery electrical storage system (BESS)/grid services system 103, which could connect to electrical grid 100 through a bidirectional inverter.

In the conceptual power distribution system of FIG. 1A, a wind park 104 connects to electrical grid 100, for example, through an uninterrupted power supply (UPS) system or an AC/DC converter. A local micro-grid 105 connects to electrical grid 100 through a subsystem such as a plant-scale intelligent power management system. Conventional electrical power plant 106 connects to electrical grid 100 through a UPS system, rectifier, inverter, or similar subsystem.

Electrical grid 100 is also shown connected to an office complex and data center 107, a set of residential users 108, an industrial complex 109, and an electromobility station 110 (e.g., electric filling station). Office and data center 107 could, for example, connect to electrical grid 100 through a UPS/DC infrastructure, while residential users 108 could connect to electrical grid 100 through a string inverter, intelligent substation, stabilizer, or the like. Industrial complex 109 connects to electrical grid 100, for example, through a power controller. A telecommunications hybrid power system 111, which could be either off-grid or grid-connected, could include a hybrid power generation system that integrates diesel, solar, and wind power generation capabilities.

Depending on the given observation point within the utility grid, a given electrical power source may provide electrical power in a range of low to high voltages, as a direct current (DC) or alternating current (AC), and/or in single or multiple phases. However, most parts of a typical electrical utility grid, as well as most conventional commercial/industrial systems, normally use three-phase alternating current (AC) power for power transmission and delivery. Therefore, some interface system or process is required for converting the corresponding forms of energy being generated by the various energy sources into a form and voltage compatible with the utility grid.

One such interface system is an electrical inverter that transforms the energy generated by a given energy source into sinusoidal AC power with a voltage compatible with the utility grid. For example, an inverter converts (or processes) energy from sources such as solar panels, wind turbines, steam turbines, DC battery plants, and the like, into a sinusoidal AC form and voltage compatible and consistent with the general AC electrical utility grid.

Figure 1B:
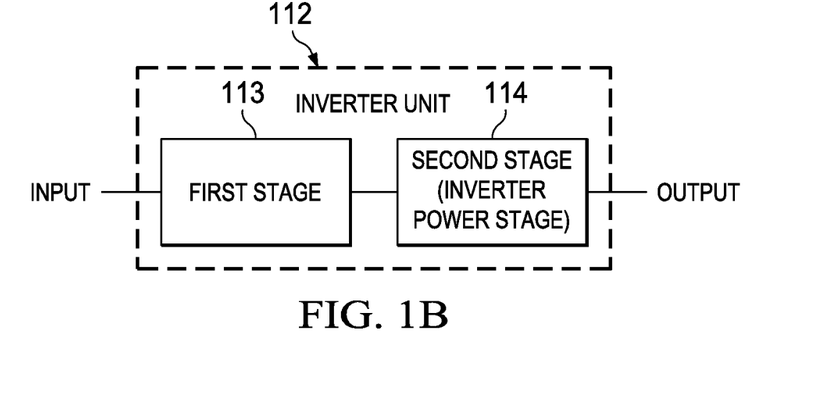
FIG. 1B is a high-level functional block diagram of a two-stage inverter unit for generally describing the technical field in which the principles of the present invention are most suitably applied.

FIG. 1B is a high-level block diagram of a representative two-stage inverter unit 112 including a first stage 113 and a second (inverter power) stage 114. In this configuration, when the input is a DC signal, first stage 113 is a DC-DC converter and second stage 114 is a DC-AC converter. When the input is an AC signal, first stage 113 is a rectifier or an AC-DC converter and second stage 114 is a DC-AC converter. Galvanic isolation can be implemented in either of the first or second stages.

In the system shown in FIG. 1B, inverter power stage 114 comprises several blocks, including an inverter power train and a control scheme or function. Generally, the inverter power train switches power to transfer energy from its input to the inverter unit 112 output. The inverter power train can include one control input for duty cycle (e.g., pulse width modulation or PWM) control of the inverter power train or several control inputs for controlling three-phase AC outputs, depending on the power train complexity. State Space Vector control is one technique known in the art for computing the Duty Cycle (DTC) used to control an inverter power train, as might be used inverter power stage 114 of FIG. 1B. Space Vector Modulation control is described in numerous papers, such as Analog Devices Application Note AN21990-11 or the IEEE paper by Keliang Zhou and Danwei Wang entitled "*Relationship Between Space Vector Modulation and Three Phase Carrier Based PWM: A Comprehensive Analysis.*"

Assuming that the inverter unit output is connected to a pure resistive load, the inverter output voltage waveform is a sine wave. However, if the load is not a purely resistive, and hence the current and voltage are not in phase, the power must be delivered to the load as active and reactive parts. To process the Reactive Power (RP), the Active Power (AP)

delivered to the load must be decreased and the inverter unit becomes less efficient. One solution to overcome the loss of the maximum AP available from the inverter unit, when RP must be processed, is to oversize the inverter unit.

In a Grid Connected Inverter (GCI), the GCI output voltage is essentially locked to the grid voltage, since the very low impedance of the grid makes it nearly impossible for the GCI to modify the grid voltage. Consequently, the current injected or pushed into the grid by the GCI is only determined by this very low impedance. In this case, the amplitude of the inverter output current is controlled with a PLL loop that increases or decreases the inverter output voltage and adjusts the phase shift of the current.

SUMMARY OF INVENTION

The principles of the present invention are embodied in systems and methods for controlling an inverter output current in response to the grid voltage and the requested output power to be delivered to an electrical grid. In one particular embodiment, both the inverter output current amplitude and phase lag are controlled to control the amount of both AP and RP delivered to the grid. In an alternate embodiment, the inverter is configured to deliver only AP to maximize inverter efficiency. In addition, the principles of the present invention allow for the copying of the shape of the grid voltage waveform such that the inverter behaves similar to a resistor to the extent that the voltage and current are proportional.

A particular representative embodiment is a method of controlling an electrical inverter having an inverter power train for outputting power to an electrical grid, which includes generating a reference current waveform in response to a request for power, the reference current waveform being shaped by the shape of a grid voltage waveform on the electrical grid. An inverter output current waveform is compared with the reference current waveform to generate an error signal from which a corrective control action signal is generated. A nominal duty cycle operating point signal is generated with a feed-forward function and added to the corrective control action signal to generate a duty cycle control signal. The duty cycle control signal is provided to a duty cycle control input of the inverter power train to generate an inverter output current waveform with a shape substantially matching the shape of the grid voltage waveform.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

The principles of the present invention and their advantages are best understood by referring to the illustrated embodiment depicted in FIGS. 2-5 of the drawings, in which like numbers designate like parts.

Figure 2:
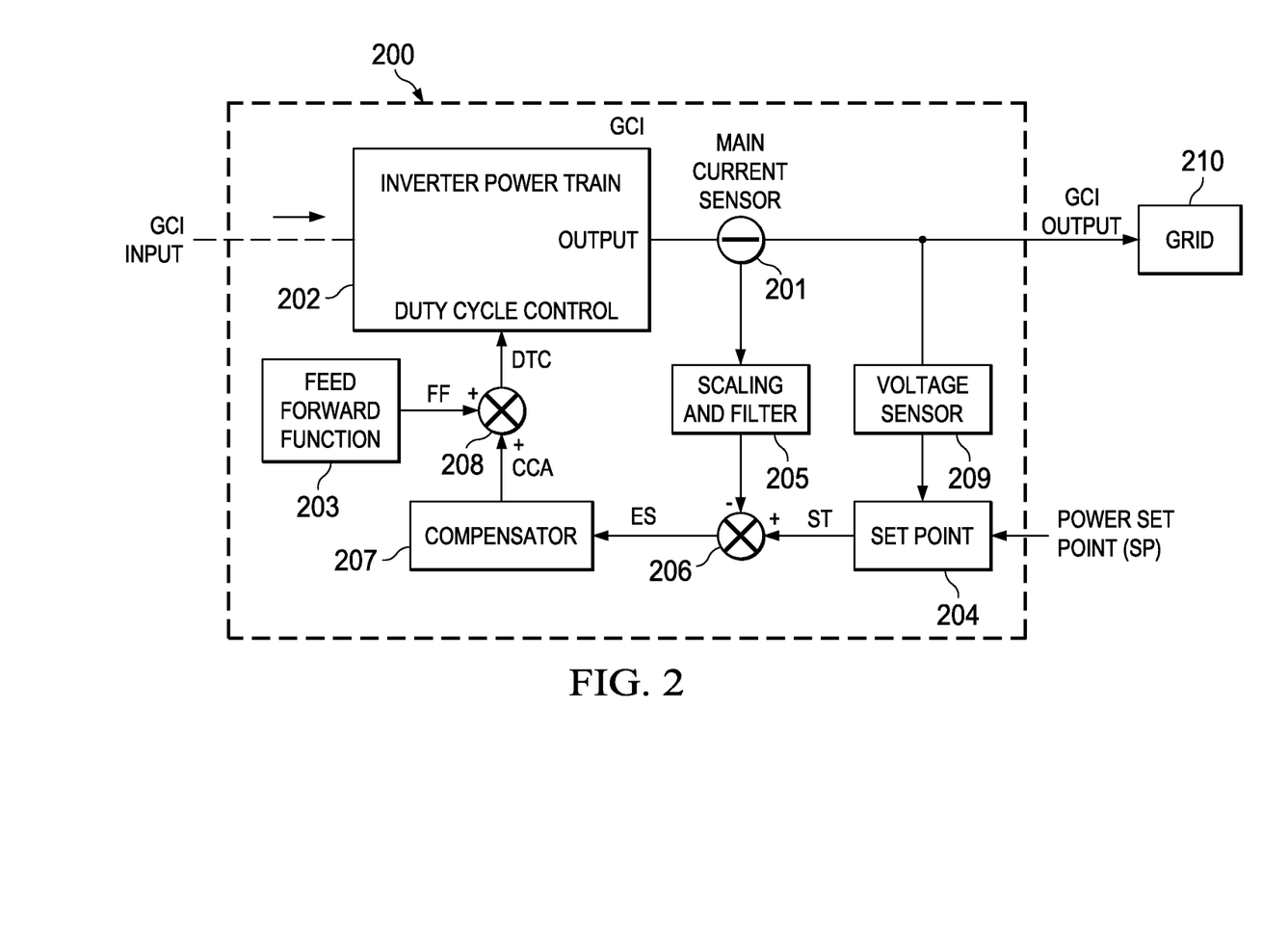
FIG. 2 is a block diagram of an exemplary Grid Connected Inverter (GCI) according to one embodiment of the present inventive principles.

FIG. 2 is a block diagram of an exemplary Grid Connected Inverter (GCI) 200 according to one embodiment of the present inventive principles. GCI 200 can advantageously be applied to the systems and subsystems shown in FIG. 1A, including the inverters, uninterrupted power supply (UPS) systems, and AC/DC converters, among others.

In the embodiment of FIG. 2, a Main Current Sensor 201 senses the current delivered to electrical grid 210 from an Inverter Power Train 202. In some embodiments, such as GCI 300 shown in FIG. 3, an Auxiliary Current Sensor 301 is also provided to sense the inductor current through embodiments of Inverter Power Train 202 having multiple filtering stages or cells. (When multiple filter stages/cells are used, the current phase lag observed at Main Current Sensor 201 can be greater than 180°, which can make GCI 300 very unstable and difficult to control.)

The grid voltage and the input voltage are also sensed such that, depending on the topology of the actual embodiment, the theoretical (normal) operating point Duty Cycle (DTC) of Inverter Power Train 202 can be calculated. In the embodiments of GCI 200 and GCI 300 shown in FIGS. 2 and 3, the theoretical operating point DTC is computed using a Feed-Forward (FF) function 203.

Generally, the power train current value is compared with an reference current ST, which is an image of the requested current that the inverter power train must deliver to the grid, as shaped by the waveform of the grid voltage. Reference current ST is generated from the Power Set Point Input Signal SP, which is a constant value, dimensioned in watts or kilowatts. For the case where the GCI output voltage and the GCI output current are in-phase, the power set point signal SP represents the active (real) power. For the case where the GCI output voltage and the GCI output current are out-of-phase, the power set point signal SP represents the apparent power (AP), which includes both active (real) and reactive (imaginary) components.

In a three-phase system, SP represents the total power being provided by the GCI to the grid, with each phase of the power output from GCI 200 presumed to provide one-third (⅓) of the total GCI output power, a presumption that holds for the vast majority of useful cases. Hence, for a three-phase system, the value of SP input into the system is divided by three (3) to produce the specific value of SP applied to each phase. In the case of a solar power generation system, for example, SP may be generated by a Maximum Power Point Tracking (MPPT) controller or similar circuitry, which attempts to maximize the photovoltaic cell array output power for the given environmental conditions. Generally, an MPPT controller continuously makes very small variations in the power set point value SP and monitors the corresponding response of the cell array from the resulting change in loading presented by the GCI unit. The MPPT controller attempts to maximize the output power from the cell array by maintaining the power draw from the cell array at the maximum power point (MPP) on the voltage-current curve characterizing the cell array.

In the illustrated embodiments of the present principles, the reference current ST is generated by Set Point function block 204, which is implemented similar to a power factor correction (PFC) unit, where a current waveform is shaped with a voltage waveform using a multiplier. (However, if a PFC unit can be qualified as "a resistor emulator", then a GCI using a control method embodying the present inventive principles can be qualified as a "negative resistor emulator" because it delivers power versus a PFC unit that absorbs power.) As discussed further below, in conjunction with FIGS. 6A and 6B, Set Point Function blocks 204 generates reference current ST by multiplying the scaled instantaneous grid voltage provided by voltage sensor 209 with the requested power set point signal SP and then dividing the result by the root-mean-square (RMS) value of the grid voltage.

Figure 3:
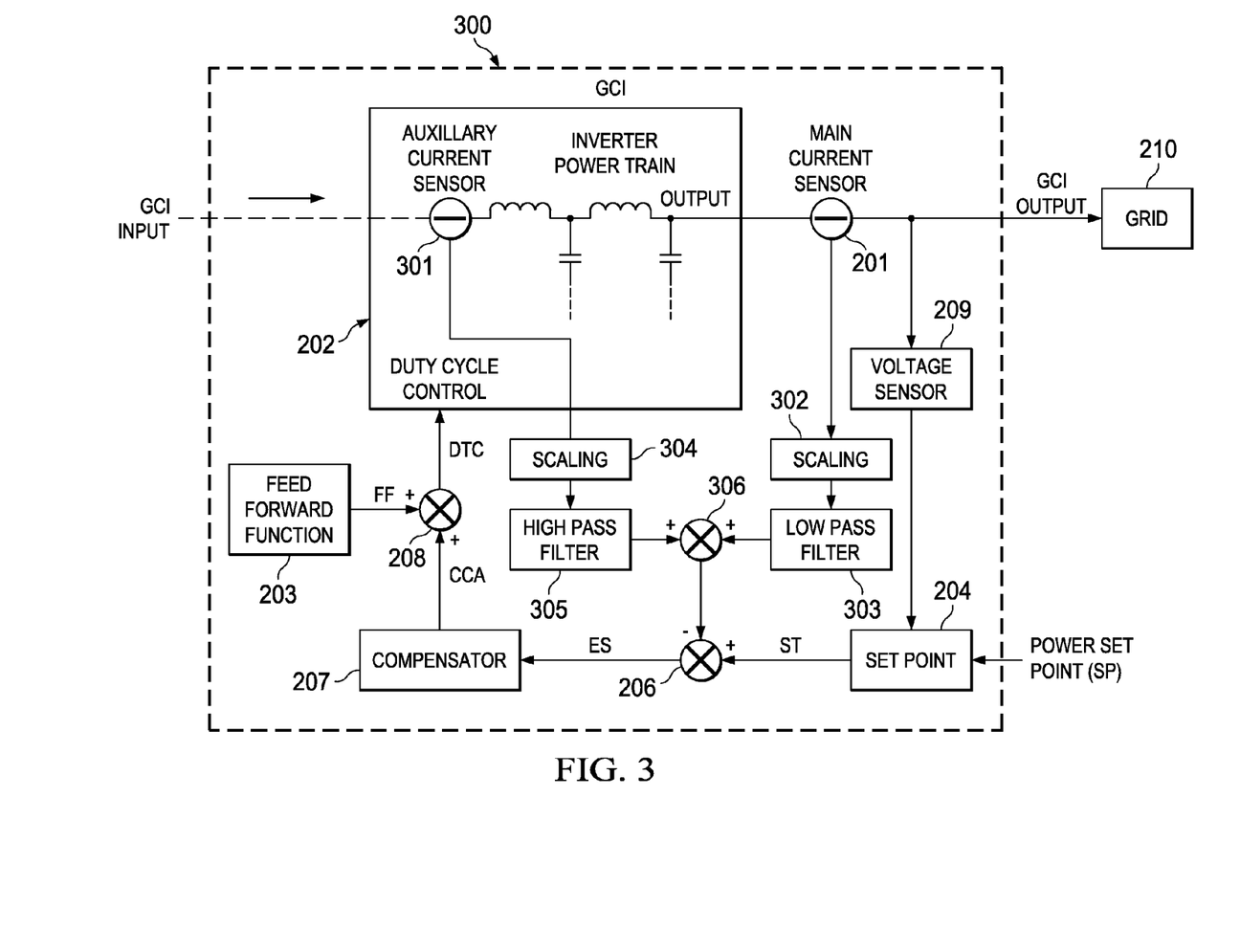
FIG. 3 is a block diagram of an exemplary GCI according to an alternate embodiment of the inventive principles, which is suitable for use with inverter power trains having multiple filtering stages or cells.

Reference current ST is then compared with the instantaneous GCI output current value through Inverter Power Train 202 to generate an error signal (ES). The instantaneous GCI output current value is determined using in Main Current Sensor 201 in GCI 200 and by both Main Current Sensor 201 and Auxiliary Sensor 301 in GCI 300.

In GCI 200, the error signal ES is generated by Combiner 206 from reference current ST and the output from Main Sensor 201 after scaling in filtering in Scaling and Filtering block 205. In GCI 300, the error signal ES is generated by Combiner 206 from reference current ST and the sum of the scaled and filtered outputs of Main Current Sensor 201 and Auxiliary Current Sensor 301. In the illustrated embodiment, the signal from Main Current Sensor 201 is passed through Scaling block 302 and a Low Pass Filter 303 and the output from Auxiliary Current Sensor 301 is passed through Scaling block 304 and High Pass Filter 305. The outputs from Low Pass Filter 303 and High Pass Filter 304 are then mixed in Combiner 306 and then passed to Combiner 206.

Next, the error signal ES is processed with a Compensator 207 to generate a corrective control action (CCA) signal. This CCA signal is added in Combiner 208 to the theoretical DTC value obtained with the FF function in Feed-forward Function block 203 to get the final DTC signal that controls Inverter Power Train 202. For Compensator 207, a PID (Proportional Integral Derivative) function, a two poles-two zeros function, or other known function may be used. (In a three-phase system, the various processing blocks of GCI 200 generate three signals ST, ES, CCA, FF, and DTC, one for controlling each phase of the output signal.)

Figure 4:
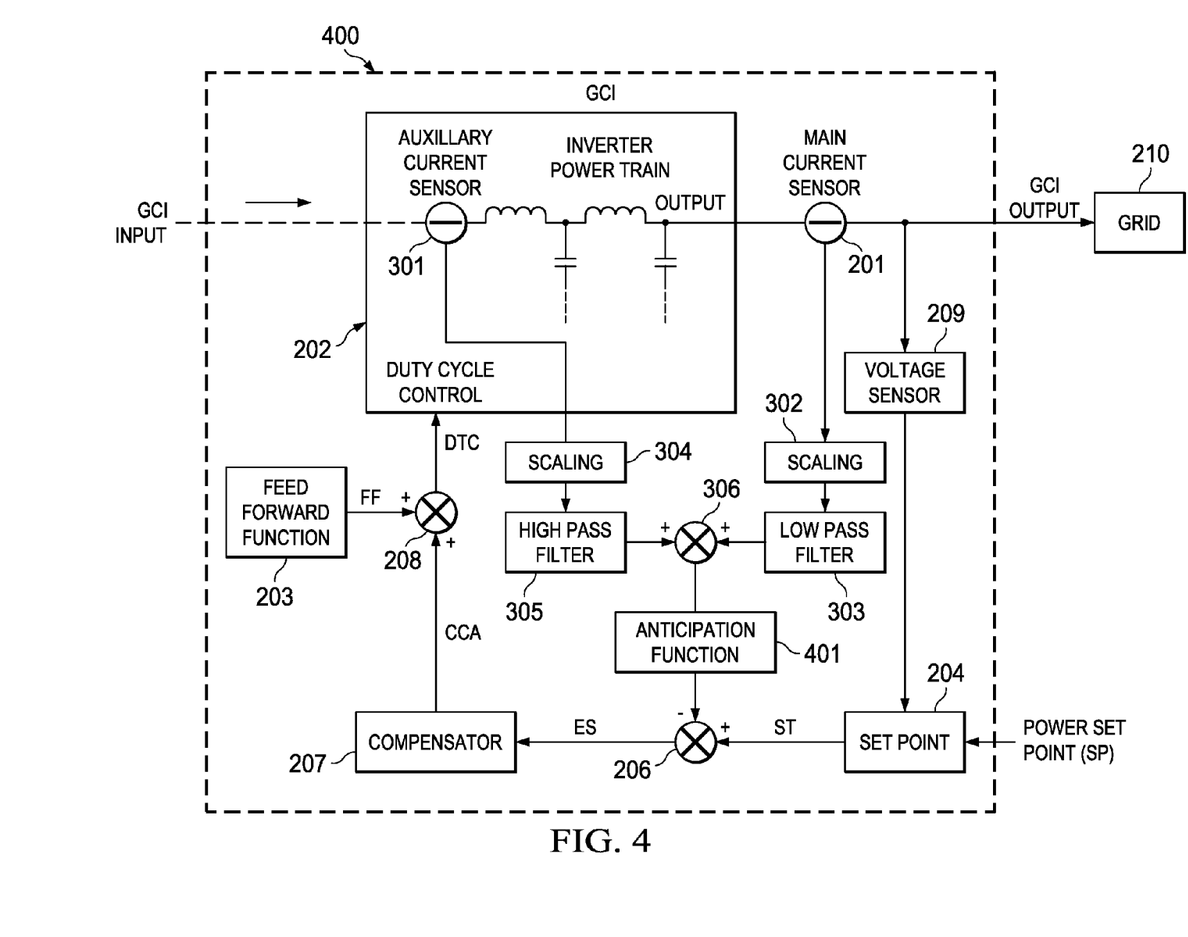
FIG. 4 is another alternate embodiment of the inventive principles that includes an Anticipation function for predicting the system set point crossing point before that set point is reached.

In GCI 400 of FIG. 4, an Anticipation Function 401 is provided after the scaled and filtered currents sensed by Main and Auxiliary Current Sensors 201 and 301 are summed in Combiner 306. Anticipation function 401, which predicts the set crossing of reference current ST and the power train current before it is actually occurs, may be, for example, a one pole-one zero function.

By delaying or advancing the phase of the reference current ST, the amount of RP delivered to the grid can be varied. If the voltage and the current are out-of-phase, the GCI inverter must process more power to deliver the RP, which is advantageous in solar inverter applications (as well as an UPS) when the load is inductive or capacitive. A capacitor bank (for power factor correction) connected to the grid is no longer needed with such a function added to the control.

One major advantage of this invention is the ability to automatically track the grid voltage shape and deliver only AP to the grid, which maximizes the efficiency of the GCI. Even if the grid voltage is not a pure sine wave, the GCI output current will have the same waveform. At any time, the voltage and current are proportional, which is not the case with systems using Space Vector Modulation Control, which operates on the assumption that the voltage is a sinusoidal waveform.

Figure 5:
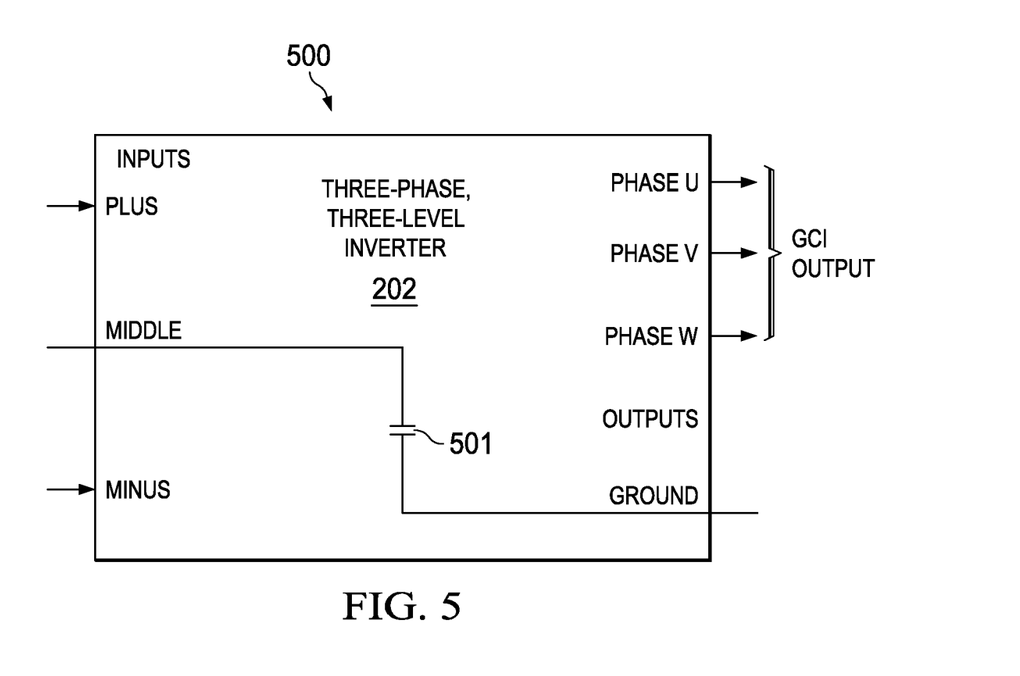
FIG. 5 is a conceptual block diagram for modeling the inverter power train shown in FIG. 24.

FIG. 5 is a conceptual block diagram 500 modeling Inverter Power Train 202 shown in FIGS. 2-4. For discussion purposes, a three-phase, three-level inverter power train is modeled, although the following discussion can be extended to single-phase inverter trains, as well as inverter power trains using a different number of PWM switching levels.

In order to reduce the input voltage range, a Capacitor 501 is provided between the output neutral (ground) point and the input middle voltage. By varying the voltage on the Capacitor 501, the output voltage can be made greater than the input voltage, even if the three-level inverter power train operates as a step down stage. In all equations below, the voltages are measured compared to ground. It should be recognized that capacitor 501 can be a physical capacitor between ground and the middle voltage point or can be obtained by a parallel connection of the output capacitors (not shown) coupled to the middle voltage points of each of the power trains within power train block 202 in a multiple-phase system.)

One FF function suitable for use in Feed-forward Function block 203 discussed above for setting the nominal (theoretical) duty cycle operating point of Inverter Power Train 202 is given by the following equations. The output voltage on one output phase (PhaseX) for the positive half-cycle is:

$$V_{PhaseX} = DutyCycle_X \times V_{Bus} + V_{Middle}: \qquad \text{Eq. 1}$$

where: $V_{Bus} = V_{Plus} - V_{Middle}$
DutyCycle$_X$=0 to 1

For the middle point voltage $V_{Middle}$, the value is defined by selecting the duty cycle equation for each phase. As the sum of the three phase voltages are equal to zero, the following equation defines the middle point voltage as a function of each duty cycle:

$$V_{Middle} = -V_{Bus} \times 1/3 \sum_X DutyCycle_x$$

By defining the middle point voltage, the sum of Duty-Cyclex is defined, Possible middle point voltages are:

$$V_{Middle} = \frac{\text{Maximum}(V_{PhaseX}) - \text{Minimum}(V_{Phase\,X})}{2} : \text{Min.-Max. Shape}$$

Or $$V_{Middle} = \frac{\prod_X V_{Phase\,X}}{[\text{Maximum}(V_{PhaseX})]^2} : \text{Third Harmonic Shape}$$

wherein the capital Greek letter pi (Π) is representative of a product.

Using Eq. 1 from above (i.e., the feed-forward function), the Duty Cycle in the steady state is calculated as:

$$DutyCycle_X = \frac{V_{PhaseX} - V_{Middle}}{V_{Bus}} \quad :Eq.\ 2$$

To demonstrate the use of the multiplier in the set point function (e.g. block 204 of FIG. 2), assume the grid voltage is a sine wave to simplify the equation. Then:

$$V_{PhaseX} = V_{RMS} \times \sqrt{2} \times \sin$$

where: "sin" is the sine waveform at the grid frequency.

The determination of the output voltage for the negative half-cycle of each phase is the same, except that $V_{Bus} = V_{Middle} - V_{Minus}$. For purposes of calculation, the output voltage for negative half-cycle can be translated to the positive half-cycle by taking the product of $V_{Bus} = V_{Plus} - V_{Middle}$ and the inverse of duty cycle, i.e., $DutyCycle_X = -1$ to 0.

The instantaneous power (IP) of the GCI is the product of the voltage and the current. The AP is the apparent power of the IP over one grid period. To model the negative resistance emulation behavior of the GCI, the inverter output current should be in phase with the voltage and have the same shape, such that the current has the following equation:

$$I_{PhaseX} = I_{RMS} \times \sqrt{2} \times \sin$$

Using the two proceeding equations, the apparent power (AP) is:

$$AP = V_{RMS} \times I_{RMS}$$

From the above:

$$I_{PhaseX} = \frac{AP}{V_{RMS}} \times \sqrt{2} \times \sin;$$

and $$I_{PhaseX} = \frac{AP}{V_{RMS}^2} \times V_{PhaseX}$$

Hence, where power set point SP represents the requested active power:

$$ST = \frac{SP}{V_{RMS}^2} \times V_{PhaseX}$$

where:
SP is the scaled requested active power AP;
$V_{PhaseX}$ is the grid voltage for Phase X; and
$V^2_{RMS}$ is the square of the root-mean-squared value of the grid voltage.

While this equation was obtained with the presumption that the grid voltage $V_{PhaseX}$, and consequently the shaped inverter output current $I_{PhaseX}$, are sinusoidal waveforms, it remains valid even if the grid voltage waveform $V_{Phasex}$ is not a sinusoidal waveform. One substantial advantage of the present inventive principles is that the shape of the output current $I_{PhaseX}$, as scaled depending on the power to be delivered to the grid, mirrors the shape of the grid voltage $V_{PhaseX}$, even if the grid voltage does not have a sinusoidal waveform (e.g., includes distortion).

Figure 6A:
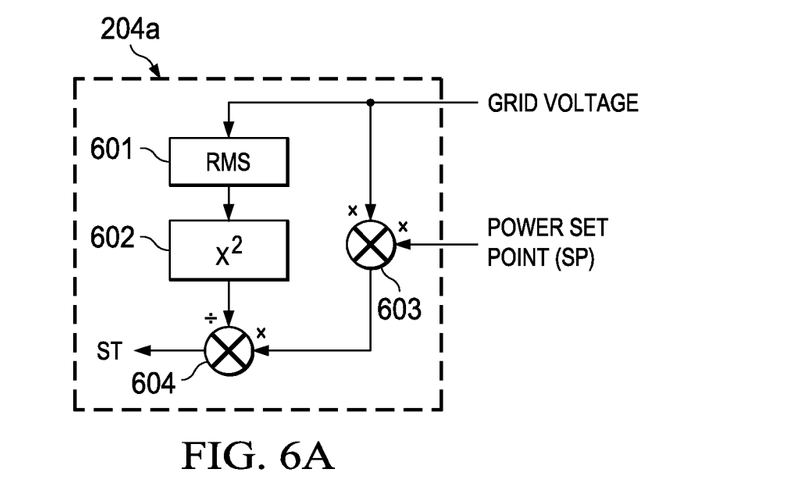
FIGS. 6A and 6B are functional block diagrams illustrative Set Point Function circuitry suitable for use in the inverter units shown in FIGS. 2-4.
Figure 6B:
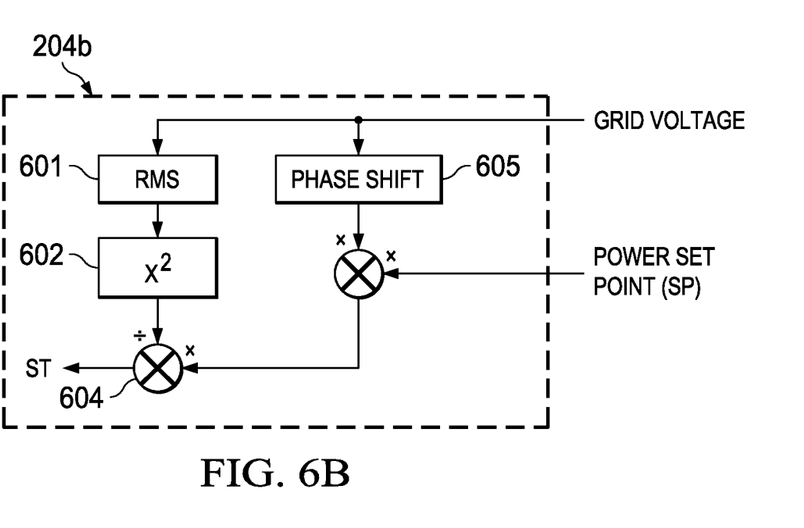

Set Point block 204 described in the above equations is shown schematically in FIG. 6A. An alternative embodiment is shown in FIG. 6B, in which a phase shift is introduced into the grid voltage to vary the amount of RP delivered to the grid. In each case, the value $V_{RMS}$ for PhaseX calculated in $V_{RMS}$ block 602 from the Phase X grid voltage $V_{PhaseX}$ and then squared in Squaring block 602. The power set point signal SP and the phase grid voltage $V_{PhaseX}$ are multiplied in multiplier 603 to generate a value of the AP for Phase X. The value of the Phase X AP is divided by the value of $V_{RMS}$ in Divider 604 to generate the reference current ST for PhaseX.

In the embodiment of FIG. 6B, Phase Shifter 605 varies the phase difference between the output voltage (Grid Voltage $V_{PhaseX}$) relative to the output current $I_{PhaseX}$. By doing so, the GCI can compensate for the grid power factor (i.e., the ratio of the active power to the apparent power) by varying the amount of reactive power being delivered to the grid relative to the active power. Advantageously, the parallel capacitors typically provided in parallel to the grid to compensate for the grid power factor can be reduced or eliminated.

The technique described above is applicable to both single-phase and multiple-phase systems. For multiple-phase systems, each phase is controlled with a dedicated control loop (e.g., Combiner 206, Compensator 207, and Combiner 208) and set point function, as described above. In a state-of-the-art embodiment of the present principles, if vector control is implemented, all phases in a multiple-phase system are controlled with a single control loop and the result of the loop (CCA) distributed according to phase, for example, using a DQ transform.

In the preferred embodiments shown in FIGS. 3-6, the processing operations (e.g., Set Point block 204, Combiners 206, 208 and 306, Divider 604, Multiplier 603, Filters and Scalers 205, 302, 303, 304, and 305, Compensator 205, Feed-Forward Function 203, and Anticipation Function) 401 are implemented in the digital domain with a digital signal processor (DSP). In alternate embodiments, these operations can be implemented, either in whole or in part, in the analog domain using commercially available power factor correction integrated circuits. In the figures, the conventional support circuitry such as analog-to-digital converters (ADCs), scaling circuitry, and dividers are not shown for clarity.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A method of controlling an electrical inverter including an inverter power train for outputting power to an electrical grid comprising:

generating a reference current waveform in response to a request for power, the reference current waveform shaped by a shape of a grid voltage waveform on the electrical grid;

comparing an inverter output current waveform with the reference current waveform to generate an error signal;

generating a corrective control action signal from the error signal;

generating a nominal duty cycle operating point signal with a feed forward function; and adding the nominal duty cycle operating point signal and the corrective control action signal to generate a duty cycle control signal for controlling the duty cycle of the inverter power train and thereby provide an output current waveform with a shape substantially matching the shape of the grid voltage waveform.

2. The method of claim 1, wherein the inverter power train outputs multiple-phase power and the duty cycle control signal controls the generation of an output current waveform of one selected phase such that a shape of the output current waveform of the selected phase substantially matches a shape of the voltage waveform of the selected phase on the electrical grid.

3. The method of claim 1, wherein generating the reference current waveform comprises:

receiving a set point value proportional to the power requested;

multiplying the set point value and the grid voltage waveform to generate a waveform substantially matching the grid voltage waveform of the electrical grid;

calculating a square of a root-mean-square voltage of the grid voltage waveform; and generating the reference current waveform shaped by the grid voltage waveform by dividing the waveform by the square of the root-mean-square voltage of the grid voltage waveform.

4. The method of claim 3, further comprising:

shifting a phase of the grid voltage waveform prior to multiplication with the set point value to vary a phase difference between grid voltage waveform and the output current waveform and thereby vary a corresponding amount of reactive power output from the electrical inverter to the electrical aid.

5. The method of claim 1, wherein comparing an inverter output current waveform with the reference current waveform to generate an error signal comprises:

scaling and filtering the inverter output current waveform to generate an image of the inverter output current waveform; and taking a difference between the image of inverter output current waveform and the reference waveform to generate the error signal.

6. The method of claim 1, wherein comparing an inverter output current, waveform with the reference current waveform to generate an error signal comprises:

scaling and low pass filtering the inverter output current waveform to generate an image of the inverter output current waveform;

scaling and high pass filtering an inverter input current waveform to generate an image of the inverter input current waveform;

adding the images of the input and output current waveforms to generate a sum;

taking a difference between the sum and the reference waveform to generate the error signal.

7. The method of claim 6, further comprising:

generating a signal predicting a crossing point of the resulting product with the reference waveform; and taking a difference between signal predicting the crossing point and the reference waveform to generate the error signal.

8. The method of claim 1, wherein the power train generates a half cycle of a phase of an output voltage waveform with an instantaneous phase voltage $V_{PhaseX}$ by switching between a voltage $V_{Plus}$ and a voltage $V_{Middle}$ with a duty-cycle controlled by the duty cycle control signal, and wherein the feed forward function provides the nominal duty cycle operating point signal as:

Nominal Duty Cycle=$(V_{PhaseX}-V_{middle})/(V_{Plus}-V_{Middle})$ where the second voltage $V_{Middle}$ is determined by a minimum-maximum shaping of the output voltage waveform as:

$V_{Middle}$=(Maximum$(V_{PhaseX})$−Minimum$(V_{PhaseX}))/2$.

9. The method of claim 1, wherein the power train generates a half-cycle of a phase of an output voltage waveform with an instantaneous phase voltage $V_{PhaseX}$ by switching between a voltage $V_{Plus}$ and a voltage $V_{Middle}$ with a duty-cycle controlled by the duty cycle control signal, and wherein the feed-forward function provides the nominal duty cycle operating point signal as:

Nominal Duty Cycle=$(V_{PhaseX}-V_{middle})/(V_{Plus}-V_{Middle})$ where the second voltage $V_{Middle}$ is determined by third harmonic shaping as:

$$V_2 = \frac{\prod_X V_{Phase\ X}}{[\text{Maximum}(V_{Phase\ X})]^2}$$

wherein the capital Greek letter pi (Π) is representative of a product.

10. A system for generating a duty cycle control signal for controlling an inverter power train providing an output current waveform to a grid operating with a grid voltage waveform comprising:

a control loop operable to
generate a reference current waveform shaped to the grid voltage waveform;
generate an error signal representing a difference between the reference current waveform and the output current waveform;
generate an corrective control action signal from the error signal;
generate a feed-forward signal representing a nominal duty cycle using a teed-forward function; and
generate the duty cycle control signal by combining the corrective control action signal and the feed-forward signal.

11. The system of claim 10, wherein the control loop comprises a selected one of a plurality of identical control loops, wherein, each control loop controls the output current waveform of a corresponding phase of multi-phase power being provided by the power train to the grid.

12. The system of claim 11, wherein the control loop further comprises set point circuitry for generating the reference current waveform and operable to:

generate a signal representing a square of a root-mean-square value of the grid voltage waveform;

scaling the grid voltage with a value representing power to be provided to the grid; and generate the reference current waveform by dividing the scaled grid voltage waveform by the square of the root-mean-square value of the grid voltage waveform.

13. The system of claim 12, wherein the set point circuitry is further operable to shift the phase of the grid voltage waveform prior to scaling with a value representing power to be provided to the grid.

14. The system of claim 10, wherein at least a portion of the control loop is implemented with a digital signal processor.

15. The system of claim 10, wherein at least a portion of the control loop is implemented in an analog integrated circuit.

16. The system of claim 10, further comprising a current sensor for sensing the output current waveform and filtering and scaling circuitry for generating a signal representing the output current waveform for comparison with the reference current waveform to generate the error signal.

17. The system of claim 16, further comprising another current sensor for sensing a power train input current waveform and filtering and scaling circuitry for generating a signal representing the power train input current waveform for combination with the signal representing the output current waveform to generate a signal for comparison with the reference current waveform to generate the error signal.

18. The stem of claim 10, wherein:
the system further comprises:
a current sensor for sensing the output current waveform; and
another current sensor for sensing a power train input current waveform; and the control loop is further operable to:
filter and scale the output of the current sensor to generate a first signal representing the output current waveform;
filter and scale and output of the another current sensor to generate a second signal representing the power train input current waveform;
combine the first and second signals;
implement an anticipation function to predict the crossing point of the combination of the first and second signals and the reference current waveform; and
in response to a result of the anticipation function, compare the combination of the first and second signals with the reference current waveform to generate the error signal.

19. The system of claim 18, wherein the anticipation function is implemented with a one-pole, one-zero function.

20. The system of claim 10, wherein generating a corrective control action comprises implementing a selected one of a proportional integral derivative function and a two-poles, two-zeros function.

* * * * *

UNITED STATES PATENT AND TRADEMARK OFFICE
CERTIFICATE OF CORRECTION

PATENT NO.         : 9,490,724 B2
APPLICATION NO.    : 14/141715
DATED              : November 8, 2016
INVENTOR(S)        : Didier Balocco Page 1 of 1

It is certified that error appears in the above-identified patent and that said Letters Patent is hereby corrected as shown below:

In the Claims

Column 9, Line 45, change "aid" to --grid--.

Column 9, Line 56, delete the ",".

Column 10, Line 45, insert --:-- after "to".

Signed and Sealed this
Tenth Day of January, 2017

Michelle K. Lee
*Director of the United States Patent and Trademark Office*